(No Model.) 2 Sheets—Sheet 1.
G. A. GEMMER.
HAY RAKE.
No. 518,993. Patented May 1, 1894.
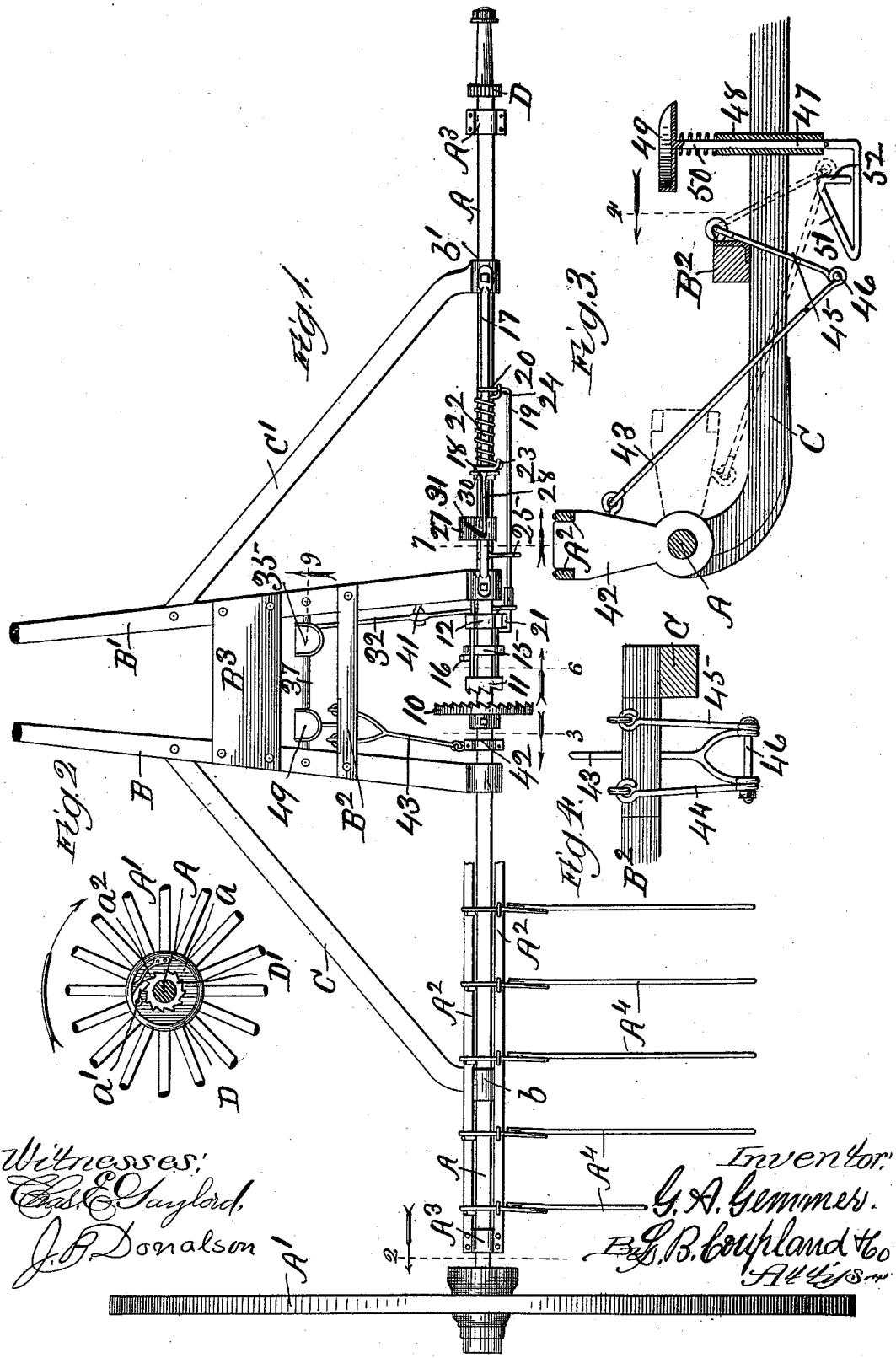

(No Model.) 2 Sheets—Sheet 2.
G. A. GEMMER.
HAY RAKE.
No. 518,993. Patented May 1, 1894.
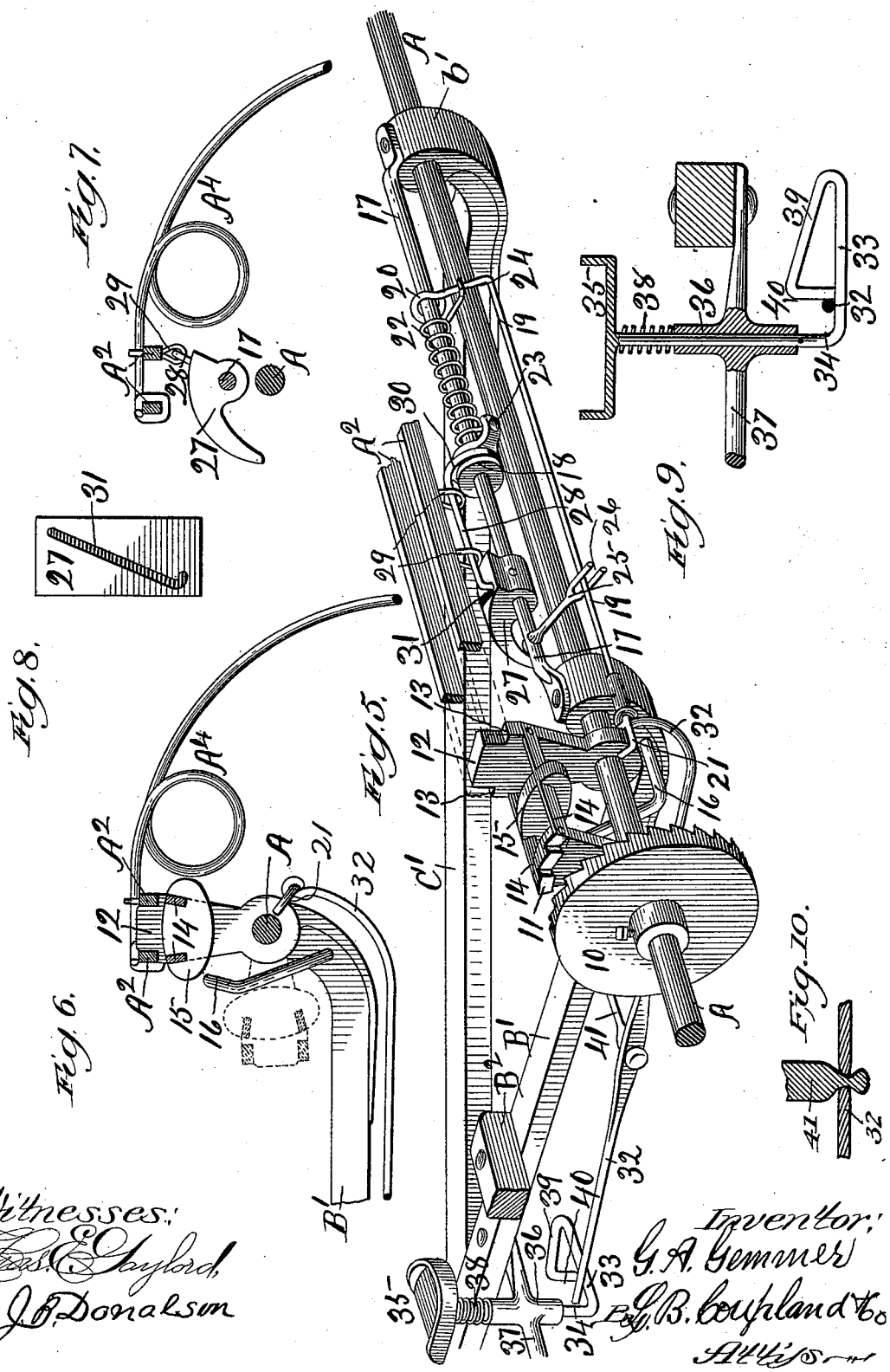
Witnesses:
Chas. E. Gaylord
J. F. Donalson
Inventor:
G. A. Gemmer
By B. Coupland & Co.
Attys

UNITED STATES PATENT OFFICE.

GEORGE A. GEMMER, OF WILLIAMSPORT, INDIANA.

HAY-RAKE.

SPECIFICATION forming part of Letters Patent No. 518,993, dated May 1, 1894.

Application filed December 1, 1893. Serial No. 492,459. (No model.)

*To all whom it may concern:*

Be it known that I, GEORGE A. GEMMER, a citizen of the United States, residing at Williamsport, in the county of Warren and State of Indiana, have invented certain new and useful Improvements in Hay-Rakes, of which the following is a full, clear, and exact description, that will enable others to make and use the same, reference being had to the accompanying drawings, forming a part of this specification.

This invention relates to improvements in the class of horse hay-rakes, and the same consists of certain novel features in the peculiar construction, combination and arrangement of the different parts as will be hereinafter set forth in detail.

In the drawings—Figure 1 is a broken-away plan; one of the wheels being removed; Fig. 2, a broken-away transverse section on line 2, Fig. 1, looking in the direction indicated by the arrow; Fig. 3, a broken-away transverse section on line 3, Fig. 1; Fig. 4, a transverse section on line 4, Fig. 3; Fig. 5, a broken-away view in perspective of a major part of the device; Fig. 6, a broken-away transverse section on line 6, Fig. 1; Fig. 7, a broken-away transverse section on line 7, Fig. 1; Fig. 8, a plan of a detached detail; and Fig. 9, a transverse section on line 9, Fig. 1.

A represents the axle, A' A' the usual sulky wheels mounted on the respective ends thereof, $A^2$ the rake-head, $A^3$ $A^3$ bearing-boxes supporting the rake-head in proper position with reference to the axle, and $A^4$ the curved spring-rake teeth which are secured to the rake-head in any suitable manner.

The draft-frame consists of the shaft members B B', mounted on the axle and connected by cross-bar $B^2$ and foot-rest $B^3$. The front ends of braces C C' are attached to the respective shafts; the rear ends having loose bearings b b' on the axle. The inner ends of the wheel-hubs D (Fig. 2) are chambered as at a. Ratchet-wheels D' $D^2$ are rigidly mounted on the axle inside of the hub-chamber. A pawl a' is pivoted to the hubs and is held normally in engagement with the ratchet-wheels by a spring $a^2$. This provides for the rotation of the wheels and axle together on the forward movement; the axle remaining stationary when backing the rake.

The means employed for dumping the rake will next be described. A ratchet-disk 10 (Figs. 1 and 5) is rigidly mounted on the axle at a point between the shafts. Adjacent to this disk is a tooth-segment 11, loosely mounted on the axle, and adapted to be thrown into and out of engagement with the ratchet-disk, thus forming a clutch arrangement. The lower end of the arm 12 is loosely mounted on the axle; the upper end extending up between the bars of the rake-head, and the shoulders 13 bearing against the under side thereof. The arm 12 is connected with the moving clutch member 11, by two bars 14. A cam-shaped plate 15 is located about midway between the moving clutch member and arm 12, and is retained in place by the connecting-bars 14; these parts together forming a sliding carriage. The lower end of a locking angle-bar 16 (Figs. 1, 5 and 6) is inserted in one of the shafts; the upper unattached end terminating adjacent to, and just out of contact with, cam-plate 15, when the parts are in the normal position shown in Figs. 1, 5 and 6.

The dotted lines in Fig. 6 indicate the opposite position of the carriage and cam-plate; the rake having just discharged its load. When the clutch mechanism is thrown into engagement, the position of angle-bar 16 will be on the opposite side of cam-plate 15 from that shown in Fig. 1. Now as the rake-head rotates, in the act of dumping the detached end of bar 16 bears against that side of the cam-plate and holds the clutch-gear into engagement until the rake has reached its limit of movement, when the edge of cam-plate will have cleared the locking-end of bar 16 (dotted lines Fig. 6) and the clutch-carriage may be returned to its normal position. One end of stationary rod 17 is rigidly fastened to the inner end b' of brace C', and the opposite end to the corresponding end of shaft B', as shown in Figs. 1 and 5. A grooved collar 18 is loosely mounted on rod 17 so as to have a sliding movement thereon. An angle-rod 19 has one end loosely looped around rod 17, as at 20. The opposite end of rod 19 is bifurcated and straddles the edge of arm 12, as shown at 21, Figs. 1 and 5. A spiral spring 22 is coiled on stationary rod 17. One end of this spring is secured to sliding collar 18, as at 23, and the opposite end looped around the outer end of rod 19, as shown at 24. One end of arm 25 is attached to rod 17, while the opposite forked end 26 embraces rod 19 and assists in supporting said rod in its proper position. A cam-piece 27 is rigidly mounted on stationary rod 17. The cam-surface or face is in the arc of a circle with reference to the axle. A rod 28 is loosely supported from the rake-head (Fig. 5) by loops 29. The bifurcated end 30 of rod 28 straddles the grooved sliding collar 18; the opposite end being bent downwardly and inserted in the diagonal groove 31 (Fig. 8) in stationary cam-piece 27. The inner end of a lever 32 is looped around rod 19; the opposite or outer end resting loosely on the lower horizontal part 33 of a shifting standard 34, Figs. 5 and 9. A heel-plate 35 is mounted on the upper end of standard 34, which passes down through sleeve 36, forming a part of cross-bar 37 secured to the frame. A spring 38 supports the standard and returns the heel-plate and its standard to a normal position when the pressure thereon is relaxed. The lower part of standard 34 is turned at right-angles, as shown in Fig. 9, and then bent over and backward to present the inclined surface 39, and a shoulder-stop 40, against which bears the outer end of lever 32 when the rake-parts are in their normal position. The respective ends of lever 32 are adapted to have a lateral movement in a horizontal plane, by reason of being supported on the end of a projecting arm 41 as the clutch is thrown into and out of engagement. The pressure of spring 22 is normally toward the clutch mechanism for rotating the rake-head, so that when the operator forces down standard 34 far enough for the outer end of lever 32 to pass over shoulder 40 and rest upon the inclined surface 39, which change of position is brought about by the pressure spring 22 throwing the clutch into engagement through the medium of rod 19, and causing the rake-head to rotate in dumping its load. During this operation spring 22 is compressed by cam-piece 27, rod 28, and sliding collar 18, loosely mounted on stationary rod 17, as the diagonal groove in cam-piece forces rod 28 and collar 18 against the spring, which, when it has accumulated sufficient power, forces rod 19 in the opposite direction and disengages the clutch-mechanism and stops the rotation of the rake-head. When the clutch is disengaged, the outer end of lever 32 moves up the inclined surface and drops into its normal position back of the shoulder formed on the lower end of the standard. An arm 42 is loosely mounted on the axle (Figs. 1 and 3) adjacent to the outer side of the clutch-disk. The upper end of this arm is secured to the rake-head so as to rotate therewith; the dotted lines in Fig. 3 indicating its opposite or horizontal position. To this arm is loosely attached one end of rod 43, the opposite bifurcated end (Figs. 1 and 4) being connected to the lower ends of links 44 and 45 by a bolt 46. The upper ends of these links are loosely attached to the frame-work. A standard 47 extends down through sleeve 48, forming a part of cross-bar 37. A heel-plate 49 is mounted on the upper end of this standard which is retained in proper position by a spring 50. The lower end of this standard is turned at right-angles and then bent to present the inclined surface 51 and a stop-shoulder 52, being a duplicate of companion-standard 34. Now, as the rake-head is rotated in the act of dumping, the bolt 45, connecting-rod 43, and links 44 and 45 ride up the inclined surface 51 of the lower part of standard 47 and drop in behind shoulder 52, as indicated by dotted lines in Fig. 3, thus locking and holding the rake in its highest position after the rotating clutch-mechanism has been thrown out of engagement. By pressing down on heel-plate 49, this locking mechanism is disengaged and the rake drops. By this arrangement the rake is always under the complete control of the operator.

Having thus described my invention, what I claim as new, and desire to secure by Letters Patent, is—

1. In a hay-rake, the combination with the axle, of a ratchet-disk, rigidly mounted thereon, a toothed segment, loosely mounted on said axle, an arm 12, loosely mounted on said axle, the upper end loosely engaging with the rake-head, the bars 14, connecting the movable clutch-member and arm 12, the stationary rod 17, the grooved collar 18, loosely mounted thereon, the rod 19, having one end loosely looped around rod 17; the opposite bifurcated end engaging with arm 12, the spiral-spring 22, coiled on rod 17, the cam 27, and rod 28, substantially as and for the purpose set forth.

2. In a hay-rake, the combination of the axle, the clutch segment, arm 12, the cam-plate, located therebetween and moving with the rake-head, the locking angle-bar 16, and the spring, adapted to impart a sliding movement to the cam plate, substantially as and for the purpose set forth.

3. In a hay-rake, the combination with the stationary rod 17, of a cam-piece, provided on its face with a diagonal groove and rigidly mounted on said rod, the rake-head, the sliding-collar 18, the sliding-rod 28, loosely supported from the rake-head and having one end inserted in said diagonal groove, the opposite end engaging with collar 18, the spiral-spring 22, the rod 19, the ratchet-disk, rigidly mounted on the axle, a toothed segment, loosely mounted on the axle, and the lever connection for throwing the clutch mechanism into an engaged position, substantially as set forth.

GEORGE A. GEMMER.

Witnesses:
J. E. DAME,
ALEX. B. BOYER.